Figure 1:
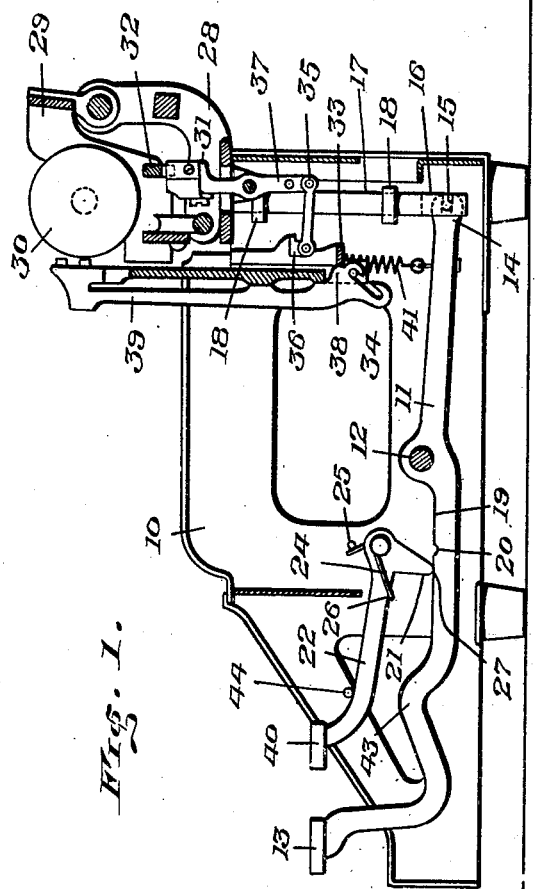

C. SPIRO.
PLATEN SHIFT LOCK.
APPLICATION FILED JAN. 11, 1919.

1,319,807.

Patented Oct. 28, 1919.

WITNESS:
Thos W Riley

INVENTOR.
Charles Spiro
BY Alfred T. Gage
ATTORNEY.

UNITED STATES PATENT OFFICE.

CHARLES SPIRO, OF NEW YORK, N. Y., ASSIGNOR TO GOURLAND TYPEWRITER CORPORATION, OF NEW YORK, N. Y., A CORPORATION OF NEW YORK.

PLATEN-SHIFT LOCK.

1,319,807.  Specification of Letters Patent.  Patented Oct. 28, 1919.

Application filed January 11, 1919. Serial No. 270,671.

*To all whom it may concern:*

Be it known that I, CHARLES SPIRO, citizen of the United States, residing at New York, in the county of New York and State of New York, have invented certain new and useful Improvements in Platen-Shift Locks, of which the following is a specification.

This invention relates to a platen shift lock and particulary to a construction wherein an auxiliary lever actuates and locks the ordinary platen shift key lever in the operation of a typewriting machine.

The invention has for an object to provide a novel and improved construction and arrangement of the shifting and locking levers whereby the latter is frictionally held in contact with the shift key lever against a restoring tension which retracts the locking lever from the shift lever upon actuation of the latter.

A further object of the invention is to provide an improved form of locking lever having a finger member adapted to engage a seat upon the shift key lever and provided with a restoring spring arranged to automatically retract said finger from its seat when the shift key lever is further depressed.

Other and further objects and advantages of the invention will be hereinafter set forth and the novel features thereof defined by the appended claims.

In the drawing—

Figure 2:
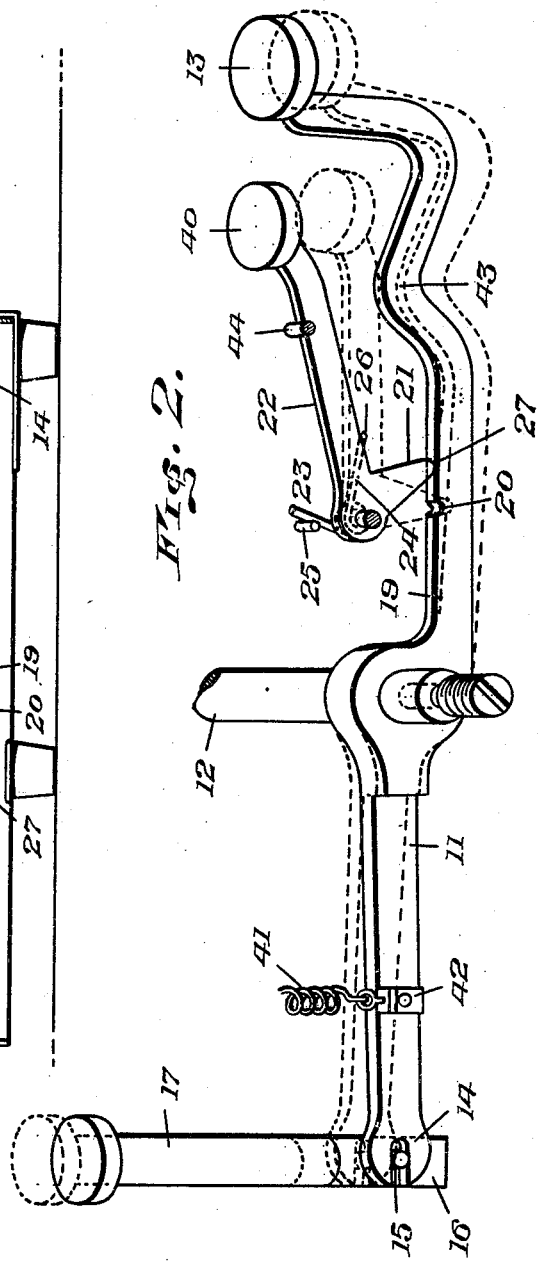

Figure 1 is a vertical section illustrating the invention disposed in relation to coöperative parts of a typewriter; and Fig. 2 is a detail perspective of the shift and locking levers.

Like numerals refer to like parts in the figures of the drawing.

The numeral 10 designates the frame of a typewriter which may be of any desired size or configuration. Within this frame a shift key lever 11 is suitably pivoted intermediate its ends, for instance by a cross bar 12 extending between the opposite sides of the frame. This lever is provided at its front or keyboard end with a finger piece 13 of ordinary form, and at its rear end with a forked portion 14 adapted to embrace a pin 15 carried by the recessed lower end 16 of the vertically sliding post 17. This post reciprocates through suitable guides 18 secured to the machine frame and is duplicated, together with the shift key lever, at the opposite side of the machine. The flat face of the recessed end 16 provides a guide and plane side bearing for the forked end of the shift key lever to insure its oscillation in a proper path and prevent accidental disconnection.

The shift key lever 11 is provided upon its upper surface or edge 19 with a seat or recess 20 disposed forward of the pivot of the lever and adapted to receive the finger member 21 carried by the locking lever 22. This locking lever is pivotally mounted at 23 upon the side of the machine frame and provided with the usual finger piece 40 by which the lever may be depressed. Surrounding the pivot 23 a retracting or restoring spring 24 is disposed, and one end thereof engages a stop 25 while the opposite end 26 extends beneath the locking lever 22. The upward travel of this lever is limited by a stop pin 44 disposed above the same, while its downward movement is limited by the shoulder 43 formed at the forward end of the portion 19 of the shift key lever. Any desired form of spring and stop may be used to secure these functions.

The finger member 21, which is the active locking element, extends forwardly at an angle to the lever 22 and travels upon the flat upper face 19 of the shift key lever. For this purpose the free end of the finger is rounded or curved as at 27 and formed to secure frictional contact with the walls of the seat upon the shift key lever by which it is held against the constant retracting tension of the locking lever. The shift key lever is provided with the usual balancing spring 41 extending from a connection 42 thereon to the machine frame. The depressed horizontal portion 19 of the shift key lever provides space for a closely nested arrangement of the locking lever to produce a compact construction.

The post 17 carries at its upper end the carriage mechanism, comprising for instance the guide frame 28 secured to the post and supporting the ordinary platen frame 29 provided with the platen 30. The base of the guide frame 28 is provided with the usual escapement dogs 31 coöperating with the rack 32 carried by the platen frame, and all of these parts are mounted to shift vertically with the carriage for upper or lower case writing. These dogs are rocked or actuated by the movable universal bail 33 mounted upon the type bar sector 34 which is fixed relative to the vertical shift of the escapement dogs. To maintain a constant connection having equal movement in all positions a link 35 is pivoted to a lug 36 from the bail and also to a depending portion 37 from the dog holder. The bail is moved in the usual manner by the contact therewith of a shoulder 38 upon the typebar 39 pivotally mounted in the sector 34.

In the operation of the invention the platen is shifted and restored by the actuation of the shift key lever in the ordinary manner and this lever is held while the upper case character is being printed. If it be desired to lock the platen in shifted or raised position the locking lever is depressed and travels upon the upper face of the shift key lever until it reaches the retaining seat where it is frictionally held against the tension of the restoring spring upon the locking lever. This operation depresses and locks the shift key lever by a single movement, and both levers may be instantly released by a slight further depression of the shift key lever which permits the spring tension upon the locking lever to immediately retract and restore the same to initial raised position. In case it is desired to only partially shift the platen for special work the locking lever may be depressed to the desired extent for that purpose and without locking the shift key lever.

The pivoted link connection between the dog holder and the universal bail provides means for transmitting an equal movement for oscillating the holder in either of its vertically shifted positions. The invention presents a simple, efficient and economically manufactured construction for shifting and automatically locking the platen of a typewriting machine.

While many of the details of construction have been specifically shown and described, still changes may be made therein as the invention is not confined to such details, as set forth by the following claims.

What I claim is:—

1. In a platen shift lock, a shift key lever, a shift lock member pivoted above said lever to oscillate in the vertical plane thereof and to travel upon the upper face of the key lever to depress and lock the same, and means to automatically retract said member vertically from the shift key lever upon further depression thereof.

2. In a platen shift lock, a shift key lever having a seat upon its upper face, a shift lock member mounted above said lever in the vertical plane thereof to travel upon its upper face to depress the lever and enter said seat to lock the same, and means to retract said member from the shift key lever upon a further depression thereof.

3. In a platen shift lock, a shift key lever having a retaining portion upon its upper face, a locking lever pivoted above the key lever and having a finger disposed to oscillate in the vertical plane thereof and travel longitudinally upon its upper face to depress and lock the key lever, and means for automatically retracting the locking lever in a vertical plane from the shift lever upon a further depression thereof.

4. In a platen shift lock, a shift key lever having a retaining portion upon its upper face, a locking lever pivoted above the key lever and having a finger disposed to oscillate in the vertical plane thereof and travel longitudinally upon its upper face to depress and lock the key lever, means for automatically retracting the locking lever in a vertical plane from the shift lever upon a further depression thereof, and means engaging said locking lever to limit said retracting movement.

5. In a platen shift lock, a shift key lever, a locking lever pivoted above the same and having a finger disposed to travel upon the upper face thereof, a spring connected to said locking lever for retracting the finger from the shift key lever, a stop engaging the locking lever to limit its retracting movement, and a portion upon the upper face of said shift key lever to retain said finger against the tension of said spring.

6. In a platen shift lock, a pivoted shift key lever having a seat upon its upper face, a locking lever having a finger disposed to travel upon said face and to be frictionally retained in said seat, and tension means connected to said locking lever to retract said finger from its seat when the frictional resistance is relieved.

7. In a typewriter, a frame, a shift key lever pivoted therein intermediate its ends, a locking lever pivoted upon the frame above said shift key lever and having an angularly disposed finger traveling upon the upper face thereof, a spring connected to retract said finger from the shift key lever, and a seat upon the upper face of said shift key lever to frictionally retain said finger against the tension of said spring.

8. In a typewriter, a frame, a shift key lever pivoted intermediate its ends upon said frame, a locking lever pivoted upon the side of the frame over said shift key lever and having an angularly and forwardly disposed finger to travel thereon, a retracting spring surrounding the pivot of said locking lever, a stop to limit the upward travel thereof, and a recess formed in the upper face of the shift key lever forward of its pivot to retain said finger against the tension of said spring.

9. A shift key lever provided with a pivot and a horizontal portion at one side thereof having a recess in its upper face, and a locking member mounted above said lever to depress the same and lock the lever by engagement with said recess.

10. A shift key lever provided with a pivot and a depressed horizontal portion extending forward therefrom and having a locking seat in its upper face and a raised shoulder at the forward end of said portion and a locking member mounted above said lever to depress the same and lock the lever by engagement with said seat when in contact with said shoulder.

In testimony whereof I affix my signature.

CHARLES SPIRO.

Copies of this patent may be obtained for five cents each, by addressing the "Commissioner of Patents, Washington, D. C."